United States Patent [19]

Watson et al.

[11] Patent Number: 5,392,828
[45] Date of Patent: Feb. 28, 1995

[54] REFILLABLE LIQUID RESERVOIR

[75] Inventors: Stephen J. Watson, Greenwood; Sam R. Leighton, Nedlands; Peter W. Czwienczek, Hamersley, all of Australia

[73] Assignee: Orbital Engine Company Pty. Limited, Balcatta, Australia

[21] Appl. No.: 80,235

[22] Filed: Jun. 23, 1993

[30] Foreign Application Priority Data

Jun. 23, 1992 [AU] Australia ............... PL3094

[51] Int. Cl.⁶ ............... B65B 1/04; B65B 3/04
[52] U.S. Cl. ............... 141/330; 141/106; 141/344; 141/351; 141/364
[58] Field of Search ............... 141/1, 2, 21, 106, 198, 141/312, 319, 320, 329, 330, 344, 346, 351, 352, 363, 364, 321; 220/403, 461, 462; 222/105, 183

[56] References Cited

U.S. PATENT DOCUMENTS

| | | | |
|---|---|---|---|
| 4,173,858 | 11/1979 | Cassia | 141/330 |
| 4,846,236 | 7/1989 | Deruntz | 141/329 |
| 5,072,762 | 12/1991 | Jimenez | 141/330 |
| 5,111,910 | 5/1992 | Sheppard, Jr. | 141/330 |
| 5,121,778 | 6/1992 | Baker et al. | 141/330 |
| 5,131,566 | 7/1992 | Bavegems | 141/330 |
| 5,156,295 | 10/1992 | Gordon et al. | 222/183 |
| 5,220,949 | 6/1993 | Rufenacht | 141/2 |
| 5,273,083 | 12/1993 | Burrows | 141/18 |

FOREIGN PATENT DOCUMENTS

| | | |
|---|---|---|
| 0001595 | 6/1979 | European Pat. Off. |
| 0137908 | 4/1985 | European Pat. Off. |

Primary Examiner—Ernest G. Cusick
Assistant Examiner—Steven O. Douglas
Attorney, Agent, or Firm—Nikaido, Marmelstein, Murray & Oram

[57] ABSTRACT

An oil reservoir for the supply of oil to an internal combustion engine, the reservoir 50 having an upwardly open filler passage 53 to receive a neck portion 64 of an oil container 64. The reservoir filler passage 53 being closed by a wall 54 spaced inwardly from the open end thereof and an opening 56 is provided in said filler passage wall 54 located to inhibit direct communication between the filler passage 53 and the interior of the reservoir 50. The filler passage 53 is adapted to sealably engage the container neck 65 upon the container neck 65 being inserted into the filler passage 53 a pre-determined extent, and to puncture a closure wall 70 of the container neck 65 after said sealed engagement is established to permit oil to flow from the container 64 through said opening 56 in the filler passage wall 54 into the reservoir 50.

21 Claims, 5 Drawing Sheets

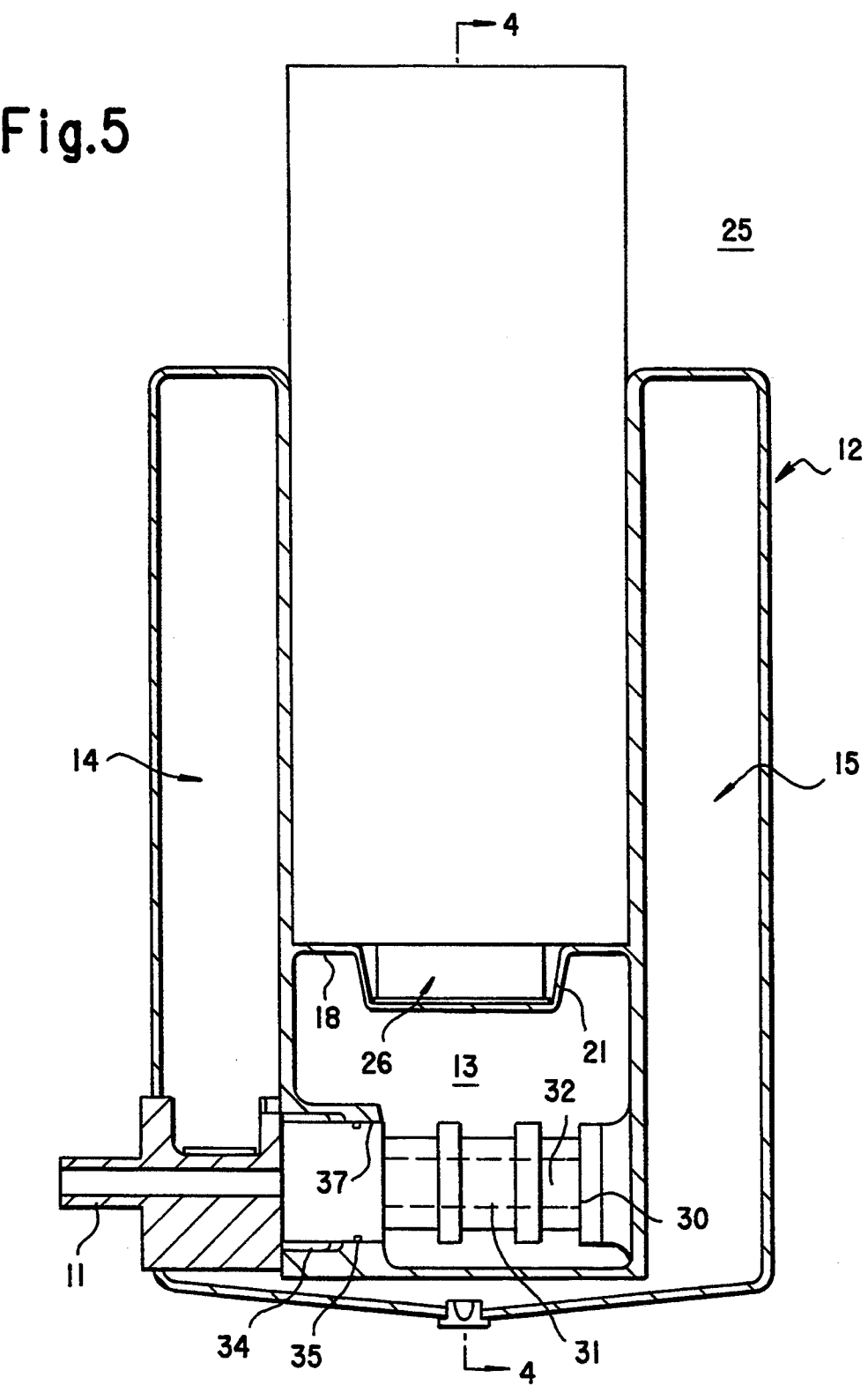

REFILLABLE LIQUID RESERVOIR

This invention relates to a refillable liquid reservoir such as a reservoir for providing oil for lubrication of an internal combustion engine. Although the refillable reservoir herein disclosed has a wide sphere of application it will hereinafter be discussed and described as applicable to an oil reservoir for an internal combustion engine. However, it is clear that the same reservoir may be used in other applications.

It is customary in four stroke cycle engines to provide for the storage of oil in the sump or crankcase of the engine, with an oil pump to draw oil from the sump and distribute it to the relevant areas of the engine. In two stroke engines, the crankcase is usually part of the air induction system and can therefore not also function as a storage reservoir for oil. Historically, in relation to two stroke cycle engines, it was the practice to pre-mix oil with the fuel and although this was successful from the lubrication point of view, it did present problems, not the least of which was the inconvenience of mixing the fuel with the oil and the limited availability of fuel having oil pre-mixed therein. In more recent times, it has been the practice to provide two stroke cycle engines with an independent oil reservoir, with an associated pump and metering device arranged to deliver oil at a regulated rate to the fuel and/or air introduced to the engine whilst in operation. Although this procedure was more convenient than pre-mixing the oil with the fuel, there still remained the problem that a significant proportion of the oil supplied with the fuel was burnt in the combustion chamber which gave rise to undesirable levels of harmful exhaust emissions.

Due to the recent development of two stroke cycle engines to a level where they are acceptable as engines for vehicles, and in particular, high volume produced passenger vehicles, a need has arisen to provide a more effective lubrication system which does not have an associated exhaust emission problem. Further, the lubrication needs of modern two stroke cycle engines can call for particular properties of or additives in the oil, not normally provided in oils used in more conventional vehicle engines operating on the four stroke cycle. Accordingly, there is a potential for the incorrect oil to be used in relation to a two stroke cycle engine in a vehicle due to the longstanding conventional practice that all vehicle engines use the same type of oil.

It is therefore the object of the present invention to provide a refillable liquid reservoir which is adapted so that the risk of the incorrect liquid being placed therein is at least substantially reduced and so the general public will recognise that conventional containers or dispensers are not appropriate for use in replacing or replenishing liquid in the reservoir. In particular, an example of such a reservoir is an oil reservoir for an internal combustion engine.

With this object in view there is provided a reservoir for the storage of liquid having an upwardly open filler passage to receive a neck portion of a liquid container having a closure wall, said reservoir filler passage being closed by a wall spaced inwardly from the open end thereof, an opening in said filler passage wall located to inhibit direct communication between the filler passage and the interior of the reservoir, said filler passage being adapted to sealably engage a container neck portion being inserted into the filler passage a predetermined extent, and to puncture said closure wall in the container neck portion after said sealed engagement is established to thereby permit the liquid to flow from the container through said opening in the filler passage wall into the reservoir.

Conveniently the filler passage is arranged to inhibit the flow of liquid from the filler passage into the reservoir when the container neck portion is not in sealed engagement with the filler passage.

More specifically there is provided a reservoir for the storage of liquid having an upwardly open filler passage to receive a neck portion of a liquid container, a wall spanning said filler passage spaced inwardly from an open end thereof, and a conduit integral with said wall to define a passage therethrough and constructed at the upper end to fracture a closure wall in the neck portion of the container upon the neck portion being inserted into the filler passage, an opening in the wall of the conduit to communicate with the interior of the container after said fracture of the closure wall, said conduit being adapted to inter-engage with the neck portion of the container at a level below the opening in the conduit as the conduit is being received in the neck portion to form a seal therebetween before the closure wall is fractured.

Conveniently the opening in said conduit is located in a portion of the wall of the conduit parallel or steeply inclined to the direction of insertion of the neck portion of the container into the filler passage. The opening is located in a portion of the conduit wall that is so inclined to render it difficult for liquid to be delivered into the conduit and hence into the reservoir by the use of a conventional funnel.

Also it is preferred to provide a drain opening in the wall of the filler passage of the reservoir, preferably below the level of the opening in the conduit located in the filler passage. Thus, if liquid is delivered into the filler passage other than from a container correctly co-coordinating with the conduit, liquid will leak through the drain opening in preference to entering the conduit.

There may be provided an air port through the wall spanning the filler passage, the port providing direct communication between the interior of the reservoir and atmosphere during delivery of liquid from the container to the reservoir. The air port is preferably sized to permit air to escape from the reservoir at a rate to not significantly inhibit the inflow of liquid to the reservoir. Further it is preferred that the air port is sized to substantially restrict the rate of flow of liquid therethrough having regard to the viscosity of the liquid. The sizing of the air port in this manner is a deterrent to attempting to fill the reservoir by delivering the liquid through the air port. However, the size of the air port should be selected so that if a small quantity of liquid does collect in the inner end of the filler passage it will gradually pass through the air port into the reservoir. The deterrent can be further enhanced by locating the drain opening in the wall of the filler passage, as discussed above, or by providing an additional opening at a level only a short distance above the wall spanning the filler passage.

Alternatively suitable passages can be provided between the reservoir and the container so that when they are assembled to deliver liquid into the reservoir, air displaced from the reservoir by the incoming liquid is discharged into the container from which the liquid is being discharged. Conveniently suitable ducts may be provided in the reservoir and container that communicate when the neck of the container is fully engaged in the filler passage of the reservoir to permit the flow of air into the container from the reservoir.

It is preferred that the conduit providing communication through the wall spanning the filler passage is asymmetric with respect to the internal shape of the filler passage. This construction is a further obstacle to attempting to supply liquid to the reservoir from a container not specifically constructed for that purpose, such as conventional containers with a symmetrical neck.

There is also provided an alternative form of liquid reservoir comprising a reservoir body defining a closed chamber to receive liquid and having a delivery port, and an upwardly open cavity within the reservoir body having a lower wall portion separating the cavity from the closed chamber, a container shaped so at least an end portion thereof is receivable in the cavity and having an openable discharge port in said end portion located to operatively communicate with an inlet port in the lower wall portion of the cavity when the container is received within the cavity to thereby permit liquid to flow from the container into the closed chamber, said discharge and inlet ports being positioned in the container and cavity respectively so that they only operatively communicate when said portion of the container is received in the cavity in a single selected relative orientation.

Conveniently, the container or reservoir body has valve means associated with the delivery or discharge port, the valve means being adapted to be operated in response to the container being fully inserted into the cavity in said selected orientation to open and permit the liquid to flow from the container into the closed chamber. The provision of the valve means prevents spillage of liquid as the container is being inserted into the cavity as the valve means only opens when the container is fully inserted into the cavity in the correct orientation. Conveniently the valve means is provided in the container, and the reservoir body is provided with means to interact with the valve means, when the container is fully inserted into the cavity in the selected orientation, to open the valve means and establish communication between the container and the closed chamber for the flow of liquid into the closed chamber.

Conveniently the closed chamber extends at least partially about the cavity so that the uppermost portion of the closed chamber is above the level of said lower wall portion of the cavity. The capacities and configurations of the closed chamber and the container are selected so that when the container is correctly positioned in the cavity, is in communication with the closed chamber, and an equilibrium level of the liquid has been achieved in the container and closed chamber, that level is below the level of the upper end of the closed chamber.

Conveniently the closed chamber has vent means provided therein to permit the entry and exit of air with respect to the closed chamber as the liquid level varies in that chamber. The vent means is located above the equilibrium level of the oil in the closed chamber and container. Also a liquid level indicator or sensor can be provided to enable information regarding the level to be available externally of the reservoir. The indicator or sensor may be arranged to only indicate when the level is below a preselected level.

Means may be provided to releasably secure the container in the cavity during use and permit subsequent removal when the liquid in the container has been exhausted.

Preferably, filter means are provided within the reservoir of each of the previously described alternative constructions through which the liquid passes to the delivery port. The filter means preferably includes a filter element that is removable for cleaning or replacement purposes.

The above described construction of the reservoir wherein the container in which the liquid is dispensed is assembled to the reservoir to form an integral part thereof, ensures that liquid may only be used as provided in the correct container to co-operate in an integrated manner with the reservoir provided in association with the equipment to which the liquid is supplied. The interfitting and inter-operating relationship between the container and reservoir essentially inhibits incorrect liquid being placed in the reservoir. Further the use in one embodiment of the container as part of the liquid storage capacity of the reservoir contributes to a reduction in the overall physical dimension of the assembly.

The preferred use of the previously described liquid reservoir and associated liquid container for replenishing the liquid in the reservoir is in the supply of oil to an internal combustion engine and preferably to a two stroke cycle internal combustion engine that does not incorporate an oil sump.

The invention will be more readily understood from the following description of two practical arrangements of oil reservoirs for use in conjunction with internal combustion engines, and as depicted in the accompanying drawings:

In the drawings

FIG. 5 is a sectional end view of the container and reservoir along line 5—5 in FIG. 3.

Figure 1:
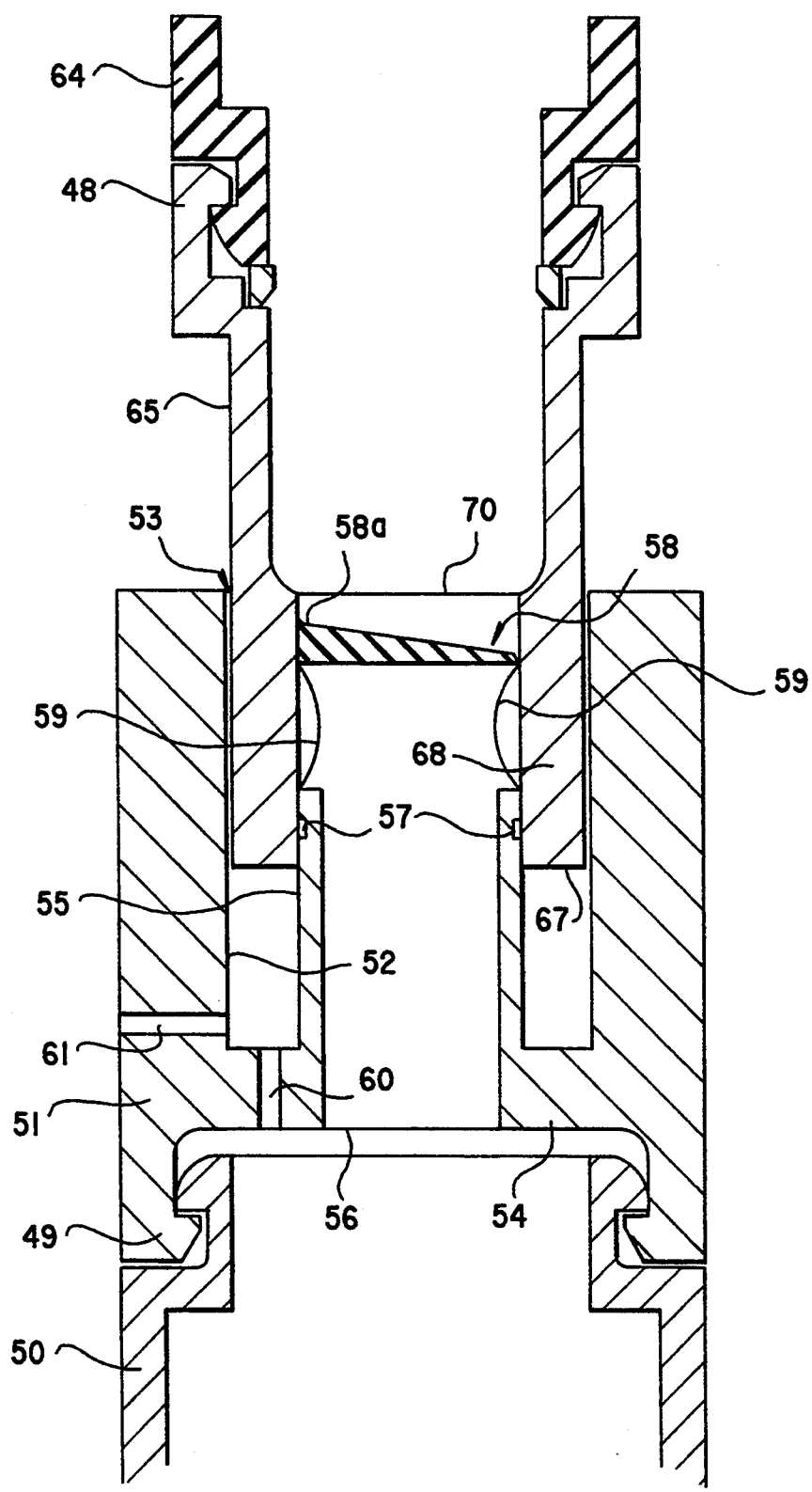
FIG. 1 is a cross-sectional view representation of neck portions of an oil reservoir and container in partial assembly.

Referring now to FIG. 1 of the drawings, an oil reservoir 50 for use in association with an internal combustion engine comprises a body portion of any appropriate shape relative to the required capacity of the reservoir and the position wherein it is to be mounted. The reservoir 50 has a neck portion 51 of circular cross-section and is positioned so the axis thereof is substantially vertical when the reservoir 50 is mounted in the operational position. The neck 51 has an internal surface 52 also of cylindrical form having an open upper end 53 and a bridging wall 54 spaced downwardly from the open end 53 and extending across the full extent of the interior of the neck 51. The wall 54 is formed integral with the internal surface 52 of the neck 51 or is assembled in sealed relationship therewith about the perimeter thereof.

A conduit 55 is formed integral with the wall 54 and is open at a lower end 56 thereof to directly communicate with the interior of the reservoir 50. An upper end of the conduit 55 is closed by an inclined endwall 58, and two cross passages 59 are provided in the conduit 55 below the inclined end wall 58, one in each side of the conduit 55. There is further provided in the wall 54 a bleed aperture 60. Preferably, notches or slots are provided in the lower edge of the internal wall of the open end 56 to break up the oil film to assist in the air escape from the reservoir.

The end wall 58 has at the upper edge thereof a piercing projection 58a which will be referred to further hereinafter. The disposition of the cross passages 59 provides that oil delivered into the open upper end 53 of the reservoir neck 51 would not freely flow through the passages 59 in the conduit 55 due to the vertical orientation of the passages 59. It would also be difficult to insert a conventional funnel into the passages 59. Further, apertures 61 provide for oil delivered directly into the neck 51 to be discharged before the level of oil rises to a level sufficient for oil to flow through the passages 59 into the reservoir.

At a location spaced a small distance below the passages 59 an O ring seal formation 57 is provided about the periphery of the conduit 55. However, it is to be appreciated that said seal formation 57 could be omitted provided that a close fit is achieved between the conduit 55 and the neck 65.

A container 64, from which the oil is to be delivered to the reservoir 50, can be of any convenient shape and is provided with a neck 65 of a cross section to be receivable within the neck 51 of the reservoir 50.

An end portion 68 of the container neck 65 is of a cylindrical cross section and dimensioned to receive the portion of the conduit 55 above the wall 54 engaging with the seal 57 on the internal surface of the neck 65 in sealed relation. A fracturable barrier 70 is provided across the interior of the neck 65 of the container 64 which will initially prevent the discharge of oil from the container 64 through the neck 65 when the container 64 is inverted. The barrier 70 is pierced by engagement with projection 58a on the endwall 58 of the conduit 55 during the insertion of the neck 65 of the container 64 into the neck 51 of the reservoir 50.

The barrier 70 is so located that it is not pierced to permit release of oil in the container 64 until after the end portion 68 of the container neck 65 has established a sealed relationship via the O ring seal 57 on the lower portion of the conduit 55 below the level of the passages 59. The end portion 68 of the container neck 65 has an axial length whereby before the end 67 thereof abuts the wall 54 in the neck 51 of the reservoir 50, the portion of the conduit 55 in which the cross passages 59 are located is positioned in that portion of the container neck 65 above the barrier 70. When so positioned there is provided an unobstructed path for oil to flow from the container 64 into the reservoir 50 through the passage 59 and the conduit 55.

Figure 2:
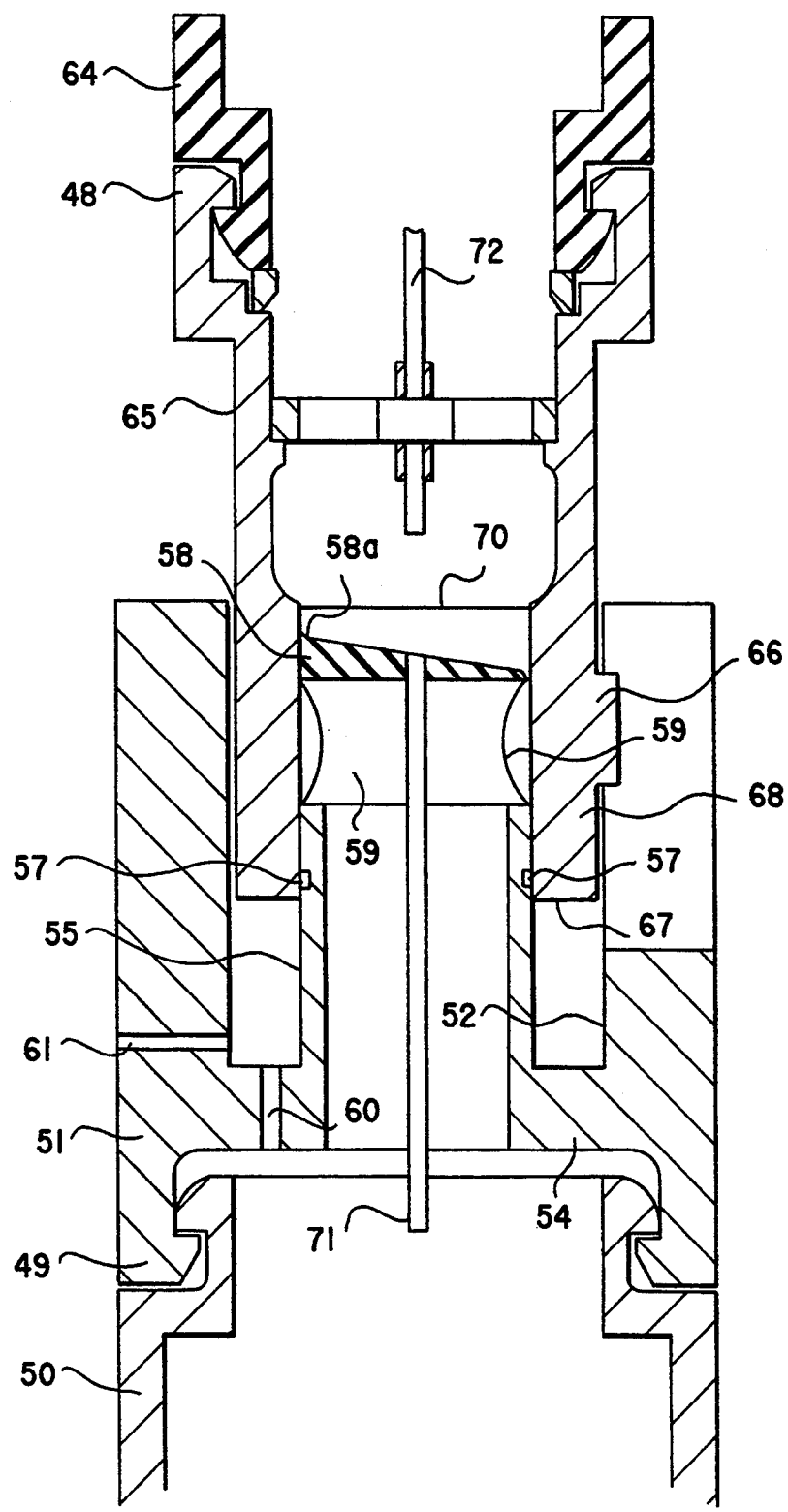
FIG. 2 is a sectional view of a modified form of the container and reservoir shown in FIG. 1.

It is to be understood that the respective necks 65 and 51 of the container 64 and reservoir 50 may be constructed integral therewith or as separate components suitably attached thereto, such as by snap-action connections as shown at 48 and 49 respectively. Also the air bleed hole 60 may be replaced by, or complemented by, a bleed passage 71 (as shown in FIG. 2) extending from the interior of the reservoir 50 through the conduit 55 and the end wall 58. Thus, air can pass from the reservoir 50 to the container as oil flows in the opposite direction. The upper end of the bleed passage 71 may cooperate with a similar passage 72 in the container 64 (also as shown in FIG. 2) that extends to near the base of the container so that when the container is inverted, to deliver oil to the reservoir, air displaced from the reservoir can be transferred to the container without the head of oil in the container resisting or restricting said flow of air. The passage in the container may be in the form of a tube made of a plastic material, and may be provided without the need for a bleed passage in the reservoir such as passage 71.

In a modified construction seen in FIG. 2 a slot 69 is provided in the internal surface 52 of the neck 51 of the reservoir 50 and a projection 66 is provided on the neck 65 of the container 64, to permit the latter to only be inserted into the neck 51 of the reservoir 50 with the neck 65 of the container in the relationship as shown in FIG. 2. Further, by the interaction between the barrier 70 in the neck 65 of the container 64 and the projection 58a of the conduit 55 in the neck 51 of the reservoir 50, liquid may only flow from the container 64 after a seal has been established between the O ring seal 57 mounted in the conduit 55 and the end portion 67 of the neck 65 of the container 64. Thus spillage of oil from the container 64 does not occur, and the full contents of the container 64 can be delivered through the passages 59 into the reservoir 50.

The bleed aperture 60 in the wall 54 permits air in the reservoir 50 to be discharged to atmosphere as the oil is flowing from the container 64 into the reservoir 50, that air then being discharged either through the aperture 61 or the gap provided between the exterior of the container neck 65 and the interior surface 52 of the reservoir neck 51. The above described construction also provides a safeguard against oil being delivered into the reservoir 50 from a container which does not have the prescribed neck formation as above referred to, and in particular will prevent delivery of oil from a container having a conventional cylindrical shaped neck.

In this regard, it will be noted that, in the construction shown in FIG. 2, oil delivered into the open upper end 53 of the reservoir neck 51 would not freely flow through the passages 59 in the conduit 55 due to the vertical orientation of the passages 59. It would also be difficult to insert a conventional funnel into the passages 59. Further, as the slot 69 in the wall of the neck 51 extends downwardly from the upper end of the neck 51 to a level below the passages 59 in the conduit 55, if oil was freely discharged into the neck 51 it would overflow through the slot 69 before it rose to a level sufficient to pass through the passages 59 into the conduit 55 and hence into the reservoir 50. Also the aperture 61 performs a similar function as previously described with reference to FIG. 1. Further, the size of the bleed hole 60 is selected so that although air can be discharged therethrough at the necessary rate to permit filling of the reservoir 50, oil itself could only flow into the reservoir 50 through the aperture 60 at an extremely slow rate, having regard to the viscosity of the oil. As an alternative, the fracturable wall 70 can be replaced by a resealable valve which opens in response to engagement with the conduit 55 or other part of the reservoir.

Figure 3:
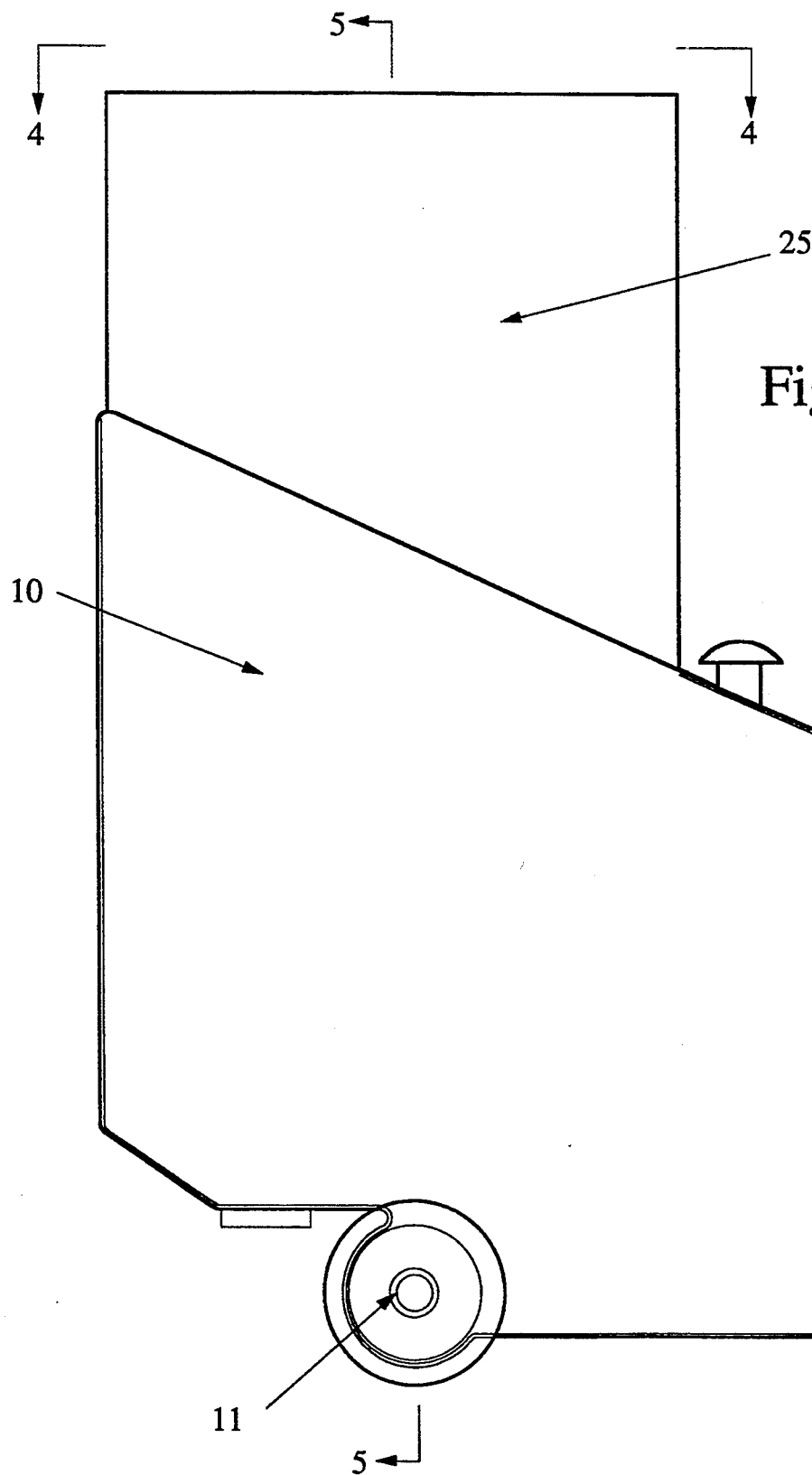
FIG. 3 is a side view of an alternative construction of the container and reservoir.
Figure 4:
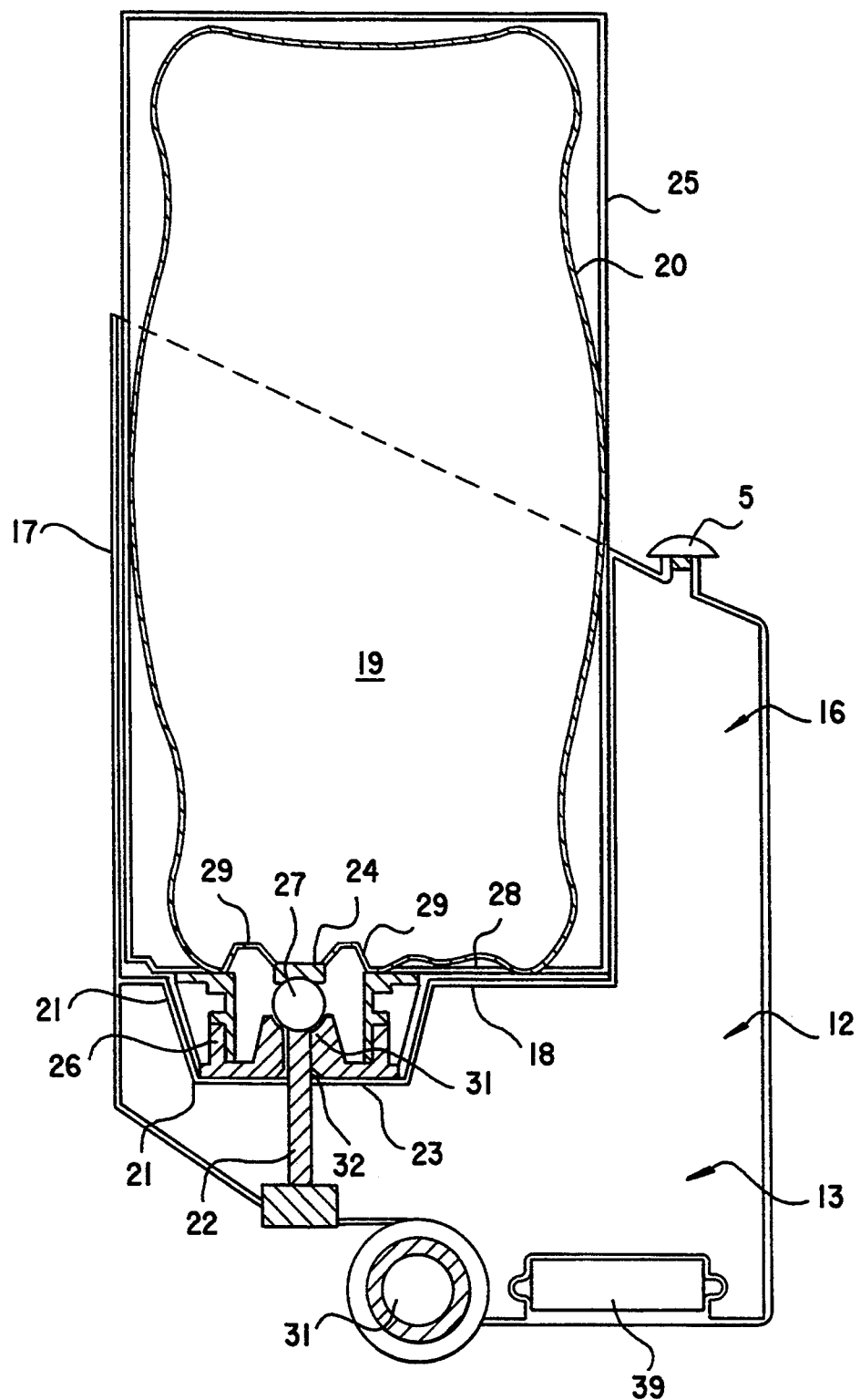
FIG. 4 is a sectional side view of the container and reservoir along the line 4—4 in FIG. 3.

Referring now to FIGS. 3 to 5 of the drawings, an oil reservoir 10 is provided with suitable means (not shown) for mounting on an engine or an appropriate structure adjacent the engine, such as a body of a vehicle, particularly a wall of an engine compartment of the vehicle. The reservoir 10 is mounted in a vertical disposition as seen in FIG. 3 with a delivery nipple 11, to which an oil line is to be fitted, arranged at the bottom of the reservoir. The reservoir 10 defines a closed chamber 12 having a lower portion 13, respective opposite side portions 14 and 15, and an end portion 16. The portions 13, 14, 15 and 16 of the chamber 12, together with a wall section 17, form an upwardly open cavity 19 having a lower wall 18 separating the cavity 19 from the lower portion 13 of the closed chamber 12.

The lower wall 18 of the cavity 19 has a sunken recess 21 with a port 32 in a base 23 thereof providing communication between the cavity 19 and the lower portion 13 of the closed chamber 12. An upper end of the portion 16 of the closed chamber 12 is provided with a two-way air bleed valve assembly 5 of any convenient construction.

A container 25 is of a generally rectangular form dimensioned to be complementary to and a relatively close fit in the cavity 19. The container 25 has a projecting portion 26 of a cross-section complementary to the recess 21 in the lower wall 18 of the cavity 19. The projecting portion 26 is arranged relative to the peripheral wall of the container 25 so that, when the container 25 is inserted into the cavity 19 in an inverted disposition, the projecting portion 26 will be received in the recess 21, with an adjacent end wall 28 of the container 25 resting upon the lower wall 18 of the cavity 19. In view of the non-symmetric disposition of the recess 21 to the cavity 19, the projecting portion 26 to the end wall 28 of the container 25, and the complementary close fitting shape of the container 25 and cavity 19, it will be seen that the container 25 can only be fully inserted into the cavity 19 when the container 25 is correctly positioned so that the portion 26 will be received in the recess 21.

The container 25 is conveniently of a known form having an outer shell of a generally rigid form and an inner liner as indicated at 20 of flexible material. Conveniently, the outer shell may be made of a cardboard or plastic material of generally rigid character, whilst the liner 20 is preferably of a flexible plastic material which is impervious to and inert to the lubricating oil or other liquid to be housed in the container 25. The liner 20 is sufficiently flexible so that it will readily collapse under atmospheric pressure as the oil therein is discharged into the closed chamber 12. Accordingly, no vent is required in the liner 20.

The projecting portion 26 is sealed to the liner, and houses a valve assembly 24 of known construction incorporating a ball 27 attached to resilient arms 29 and urged thereby to normally close the discharge passage 31 leading to the port 32. When the container 25 is inserted into the cavity 19, the ball 27 of the valve assembly is engaged by the projection 22 to dislodge the ball 27 and thereby permit the discharge of oil from the container 25 into the reservoir 10. Valve assemblies of the general form as indicated at 24 are well known and will not be described in further detail.

Located within the lower portion 13 of the closed chamber 12 is a filter assembly 30 of a generally cylindrical form with a series of filter sections 31 through which oil may pass from the chamber 12 into a central gallery 33 with which the nipple 11 communicates for the outflow of oil. The filter assembly 30 has an externally threaded portion mating with an internally threaded portion of the reservoir at 10. An O-ring seal 35 is carried in a recess in the filter assembly 30 to cooperate with a passage 37 to form an effective seal when the filter assembly 30 is effectively screwed into the reservoir.

An oil level sensor 39 is located within the lower portion 13 of the closed chamber 12 to issue a signal when the level of the oil falls below a preset value. The sensor 39 issues a signal to activate a suitable visual and/or audible warning, preferably at a remote location such as the instrument panel of a vehicle. The oil level sensor may be of any suitable known construction and may be adapted to give two signals, one indicating the oil level has fallen below the caution level and the other below the danger level.

Suitable means can be provided to releasably hold the container 25 in assembly with the reservoir 10 while in use such as a resilient band which can be manually clipped in place to maintain the container and reservoir in assembly.

It will be seen that the construction of the oil reservoir as above described with reference to FIGS. 3 to 5 provides for the oil supply in the reservoir 10 to be replenished only by the use of a container 25 of the appropriate construction to fit within the cavity 19 and having a projecting portion 26 which will correctly co-operate with the reservoir recess 21 to permit the oil to flow from the container 25 into the closed chamber 12 of the reservoir 10. Accordingly, the above construction effectively prevents accidental replenishment of the oil supply in the reservoir 10 by oil incompatible with the engine with which the reservoir 10 is associated.

It will be appreciated that the reservoirs described herein with reference to the drawings have a wide application in providing a liquid reservoir that may only be refilled by use of a specific container and thereby ensure that the reservoir is only refilled with the correct liquid. As described herein a specific application of the reservoir is as an oil supply to a two stroke cycle internal combustion engine where a specific oil with particular additives or characteristics are required.

We claim:

1. A reservoir for the storage of liquid having an upwardly open filler passage terminating in an open end to receive a neck portion of a liquid container, a wall spanning said filler passage spaced inwardly from said open end thereof, and a conduit integral with said wall to define a passage therethrough and constructed at the upper end thereof to pierce a closure wall in the neck portion of the container upon the neck portion being inserted into the filler passage, a lateral opening in the wall of the conduit to communicate with the interior of the container after said piercing of the closure wall, said opening being located to inhibit direct axial communication between the filler passage and the interior of the reservoir, said conduit being adapted to inter-engage with the neck portion of the container at a level below the lateral opening in the conduit as the conduit is being received in the neck portion to form a seal herebetween before the closure wall is pierced.

2. A reservoir as claimed in claim 1 wherein said opening in the conduit is located in a portion of the wall of the conduit that is steeply inclined to the direction of insertion of the neck portion of the container into the filler passage.

3. A reservoir as claimed in claim 2 wherein seal means are provided in the conduit arranged to sealably engage the neck portion of the container prior to the piercing of closure wall.

4. A reservoir as claimed in claim 2 wherein the conduit is arranged to sealably engage the neck portion of the container prior to establishing communication between the opening in thee conduit wall and the interior of the container and prior to the piercing of the closure wall.

5. A reservoir as claimed in claim 1 wherein said opening in the conduit is located in a portion of the wall of the conduit that is parallel to the direction of insertion of the neck portion of the container into the filler passage.

6. A reservoir as claimed in claim 1 wherein a drain opening is provided in the filler passage between the level of the wall in the filler passage and the level of the opening in the conduit.

7. A reservoir as claimed in claim 1 wherein there is provided a breather opening in the wall in the filler passage located to permit the escape therethrough of air from the reservoir as the reservoir is receiving liquid through the conduit.

8. A reservoir as claimed in claim 7 wherein said breather opening is dimensioned to restrict the flow of liquid therethrough into the reservoir and permit the flow of air therethrough from the reservoir.

9. A reservoir as claimed in claim 1 wherein a bleed duct is provided in the reservoir to provide communication between the reservoir at a level below said wall in the filler passage and a location above the upper extremity of the conduit.

10. A container adapted to interact with the reservoir as claimed in claim 9, said container having a neck portion to be received in said filler passage, and a closure wall within said neck portion located and adapted to be fractured or opened by said conduit in response to the neck portion being received in the filler passage in sealed relation below the level of said opening in the wall of the conduit wherein there is provided in said container an air duct adapted and positioned to interact with said bleed duct when the neck portion is in said sealed relation with the wall of the conduit to permit air displaced from the reservoir by the delivery of liquid thereinto from the container to pass into free space provided in the container by the discharge of liquid therefrom.

11. A reservoir as claimed in claim 1 wherein said conduit is disposed asymmetric with respect to the internal wall of the filler passage.

12. A container as claimed in claim 1 wherein the wall includes a resealable valve to be opened when the neck portion is received in the filler passage.

13. A reservoir as claimed in claim 1 being an oil reservoir.

14. A liquid reservoir comprising a reservoir body defining a closed chamber to receive liquid and having a delivery port, an upwardly open cavity within the reservoir body having a lower wall portion separating the cavity from the closed chamber and a conduit integral with said lower wall defining a passage therethrough and constructed at the upper end thereof to pierce an openable discharge port of a container upon the container being inserted into the upwardly open cavity, a lateral inlet port in the conduit to communicate with the interior of the container after said piercing of said discharge port, a container shaped so at least an end portion thereof is receivable in the cavity and having an openable discharge port in said end portion located to operatively communicate with the inlet port when the container is received within the cavity to thereby permit liquid to flow from the container into the closed chamber, said discharge and inlet ports being positioned in the container and cavity respectively so that they only operatively communicate when said portion of the container is received in the cavity in a single selected relative orientation of said container relative to the cavity of the reservoir body.

15. A reservoir as claimed in claim 4 wherein the closed chamber extends at least partially about the cavity so that the uppermost portion of the closed chamber is above the level of said lower wall portion of the cavity.

16. A reservoir as claimed in claim 15 wherein the capacity and configuration of the closed chamber and the container respectively are such that when the container is operatively positioned in the cavity an equilibrium level of the liquid is achieved below the level of the upper end of the closed chamber.

17. A reservoir as claimed in claim 16 wherein at least one vent is provided in the closed chamber above the level of said equilibrium level.

18. A reservoir as claimed in claim 15 wherein said container comprises a rigid casing with a sealed lining bag of flexible material to contain the liquid, arranged so said bag will progressively collapse as the liquid is discharged therefrom.

19. A reservoir as claimed in claim 14 wherein the discharge port in the container is adapted to open in response to the container being fully inserted into the cavity in a predetermined orientation with respect to the cavity.

20. A reservoir as claimed in claim 19 wherein at least one valve is provided in the discharge port in the container adapted to maintain the port closed, and said conduit interacts with said valve member to open the port to permit liquid to flow from the container into the closed chamber when the container is received in the cavity in said selected relative orientation.

21. A reservoir as claimed in claim 19 adapted for installation to provide oil to an internal combustion engine.

* * * * *